United States Patent [19]

van Hook et al.

[11] Patent Number: 5,057,225

[45] Date of Patent: Oct. 15, 1991

[54] METHOD OF ENRICHMENT OF OXYGEN-18 IN NATURAL WATER

[75] Inventors: W. Alexander van Hook, Knoxville, Tenn.; Andrzej G. Chmielewski, Czarnomorska; Grazyna Zakrzewska-Trznadel, Gwiazdzista, both of Poland; Nada Miljevic, Steve Todorovica, Yugoslavia

[73] Assignee: The University of Tennessee Research Corporation, Knoxville, Tenn.

[21] Appl. No.: 534,960

[22] Filed: Jun. 8, 1990

[30] Foreign Application Priority Data

Jun. 9, 1989 [PL] Poland .................. 279949

[51] Int. Cl.$^5$ .................. B01D 61/36
[52] U.S. Cl. .................. 210/640; 55/16; 203/91; 203/DIG. 17
[58] Field of Search .................. 55/16, 158; 423/139; 203/DIG. 17, 91, 10, 11; 210/640

[56] References Cited

U.S. PATENT DOCUMENTS

| | | | |
|---|---|---|---|
| 3,789,112 | 1/1974 | Pachaly | |
| 3,953,568 | 4/1976 | Seko et al. | 423/139 |
| 4,284,418 | 8/1981 | Andres | 55/16 |
| 4,285,701 | 8/1981 | Schlenker | 55/17 |
| 4,331,522 | 5/1982 | Pierini | 204/129 |
| 4,399,120 | 8/1983 | Cheung | 423/648 |
| 4,504,460 | 3/1985 | Mandrin | 423/580 |
| 4,770,785 | 9/1988 | Schaupert | 210/640 |
| 4,818,345 | 4/1989 | Jonsson | 202/163 |
| 4,879,041 | 11/1989 | Kuroka et al. | 210/640 |

FOREIGN PATENT DOCUMENTS 0335647  3/1988  European Pat. Off.
2406720  8/1975  Fed. Rep. of Germany.

OTHER PUBLICATIONS

U.S. application Ser. No. 07/535,172, filed Jun. 18, 1990, entitled "Enrichment of Water in Components of Heavy Water".

*Primary Examiner*—Frank Sever
*Attorney, Agent, or Firm*—Luedeka, Hodges, Neely & Graham

[57] ABSTRACT

A method for the enrichment of natural water in oxygen-18. Permeation followed by phase transition of lighter isotopes of water across a hydrophobic semipermeable membrane are employed to enrich the natural water in O-18 isotopes. Unexpectedly large fractionation factors have been found.

10 Claims, 5 Drawing Sheets

METHOD OF ENRICHMENT OF OXYGEN-18 IN NATURAL WATER

The subject of this invention is a method for the enrichment of natural water in oxygen-18.

Oxygen-18—isotope of the one of the light elements—useful in the tracer method in chemistry and biology, was enriched to 99.5% in 1943 by Clusius and Dickel by using thermodiffusion method. Since then a number of other enrichment methods have been considered including electrolysis, chemical exchange reactions, gaseous diffusion and fractionation distillation of water. Among them the distillation method has been employed in technological scale.

Oxygen isotope effect in electrolysis was discovered at the same time as hydrogen isotope effect (E. W. Washburn, E. R. Smith and M. Frandsen, J. Chem. Phys. 1, 288 [1933]), however any attempts to produce O-18 by this method have not succeeded (H. L. Johnston, J. Am. Chem. Soc. 57, 484 [1935]), G. Ogden, Nature 136, 12 [1935]). The study of the separation factor showed pronounced scattering of its value dependent on the material of the anode (H. Anbar, H. Taube, J. Am. chem. Soc. 78, 3252 [1956]).

Similarly other attempts to enrich oxygen by method of chemical isotope exchange reaction between $CO_2$ and $H_2O$ have not succeeded either. Although the separation factor for this reaction is high—1.046—the reaction rate is too slow to make this process useful in technological scale (W. T. Boyd, R. R. White, Ind. Eng. Chem. 44, 2302 [1952]). There has been considered another isotope exchange reaction in monoethanoloamine carbonate—$CO_2$ system using some cobalt complexes as catalyst (A. Selecki, Separation of Natural Isotopes, PWN, Warsaw, 1965, in Polish).

The enrichment of O-18 and N-15 has been studied in the exchange reaction between NO and $HNO_3$. Due to the difficulties of conversion of NO into nitric acid, decomposition of some part of the latter to elementary nitrogen and nitrogen on higher steps of oxidation which can react with water giving nitric acid has been proposed (U. Jatzkowsky, G. Stiehl, 3 Arbeitstagung uber Stabile Isotope, Leipzig 1963). This process was realized by Taylor (T. I. Taylor, J. Chim. Phys. 60, 154 [1963]) and Oziaszwili (E. D. Oziaszwili, J. W. Nikolajew and N. F. Miasojedow, Soobszcz. Akad. Nauk Gruzji 29, 289 [1962]]. The latters obtained O-18 enriched to 15 at %.

The application of diffusion methods did not give any satisfactory results (R. Sherr, J. Chim. Phys. 6, 251 [1938]).

As far the most effective method seems to be thermodiffusion, however due to very slow kinetics it is not suitable to produce large amounts of enriched water. For example, it took more than 1.5 year to obtain 250 cc of gaseous oxygen-18 in cascade of the total length of 32 m and subsequent concentration in 27 m cascade (Clusius, Dickel and Becker, Naturwiss, 31, 210 [1943]). Some modifications of this process make the method a little faster. In 4-step cascade using columns of dimensions of 3.4 m × 9.2 mm with platinum-iradium fiber (0.4 mm) in 900° C. and starting from 1.5–2.5×O-18 enriched gas, it could be possible to obtain the enrichment up to 64% of O-18 after 3 weeks and 81% after 3 weeks (K. Clusius and K. Schleich, Helv. Chim. Acta, 45, N5, 1702 [1962]). Using the initial material with O-18 concentration of 40% and 3-step cascade with 3 columns each it was concentrated to 94% of O-18 and then the product was collected with the yield of 30 cc per day. After 2 months of continuous work 2 1 of oxygen of concentration 85–90% of O-18 were obtained (E. P. Ageev and G. M. Panczenkov, Atomnaja Energia, 14, No. 5, 494 [1963]).

The enrichment of O-18 in water by fractionation distillation has been carried out in many laboratories. Huffman and Urey (Ind. Eng. Chem. 29, 531 [1937]) describe the column giving 200 cc of water consisting of 0.85 at % of O-18; Watson (J. Chem. Soc. 1969 [1937]) constructed distillation apparatus giving water of the concentration of 700 ppm of O-18 and O-17; Brodski, Aleksandrowich and Sherre (Acta Physicochem. UR35, 7, 479 [1937]) describe the column 200 cm high, Winter, Carlton and Briscoe (J. Chem. Soc. 131 [1940]) obtained water of 200 ppm of O-18, Thode, Smith and Walking (Canad. J. Res. 22, 127 [1944]) using 3-column cascade obtained 150 cc of water consisting of 1.3% of O-18 during 120 days. The progress in distillation technique made by Zavoronkov (O. W. Umarov, W. A. Sokolski and N. M. Zavoronkov, Chim. Promyszi, 404 [1956]) enabled him to obtain water of 24% O-18 and 1.7% of O-17. Dostrovsky and his coworkers using the improved fractionation distillation obtained water of 99.8% of O-18 (Dostrovsky, Llewellyn, Vromen, J. Chem. Soc. 3517 [1952]); Dostrovsky ref. Proc. 2nd Intern. Conf. Peaceful Uses Atomic Energy, Geneva, 1958, p. 605).

In the separation of fluids with similar boiling temperatures, such as isotopic mixtures, the use of the fractionation distillation or isotope exchange leads to numerous problems not existing in most of usual laboratory or industrial processes. It is the result of the low value of the separation factor and low concentration of the enriched substance in the initial material. Low values of O-18 demand the use of highly efficient columns which results in large physical dimensions. In consequence there appear various problems related with the determination of the column height and time needed to obtain assumed concentration. Nevertheless its low fractionation factor (at 100° C.=0.0032) the fractionation distillation of water is the only process used in the production of $H_2^{18}O$.

Unexpectedly it appeared that in the permeation process followed by the phase transition, relatively large fractionation factors were obtained which enables to produce O-18 in much simpler and more effective way than it has been done previously. The permeation process with the phase transition named pervaporation (due to the presence of liquid and gaseous phases) has been applied successfully in the separation of liquid mixtures. In the course of the process a liquid is in contact with one side of the polymer membrane (usually of the thickness of 20–60 μm) and permeates the membrane. After permeation the liquid is vaporized and taken out as a vapor in a stream of natural gas and generation of vacuum on that side of the membrane opposite the liquid. The liquid is enriched in one of the heavier isotopic components. The composition of the vapor depends on the temperature and initial composition of the liquid and the material of the membrane and other factors as well. The driving force of the pervaporation process is the gradient of the chemical potential caused by the difference of pressure on the opposite sides of the membrane and by the change of the physical state of the substances being separated. The process is fast and this makes it possible to use it on the technological scale especially in these cases where the use of the more conventional methods is nonadvantageous or need extremely complex apparatus, for example:

separation of azeotropic mixtures; separation of closely boiling mixtures separation of aromatic and aliphatic hydrocarbons separation of isomers dehydrogenation of alcohols, organic acids, amines and ketones removing of the reaction products from the chemical reactors (i.e. water from the estrification reactions)

separation of mixtures consisting of terminally unstable components

The application of the permeation method in the technological scale has been possible due to the development in polymer physics—it is possible now to obtain membranes of high selectivity and permeability. In the permeation processes of separation of liquid mixtures lyophilic membranes have been usually used. This means that the membrane is wetted at least by one of the components. Recently lyophobic membranes have been successfully used in the desalination of water, in the processes of the concentration of acids and etc.

Up to now nobody supposed that the permeation through the membrane enables the separation of isotopic components of water. According to the invention being proposed the enrichment of the natural water in O-18 is carried out on the semipermeable membranes in pervaporation process, in which on the vapor side of the membrane the lowered pressure is obtained by using vacuum or neutral gas. The hydrophobic membranes have been used in this process. The following hydrophobic materials are considered to be useful to prepare the membranes: polypropylene, polyethylene, polytetrafluoroethylene, silicone, cellulose esters, etc. Among the various membranes tested for its interaction with water, the most useful membranes are those made from polytetraflouroethylene.

The method, according to the invention, employs selective properties of the semipermeable membranes to enrich $H_2{}^{18}O$ in pervaporation process.

In the course of the isotope effect studies on the permeation process with the phase transition in isotopic water solution, unexpectedly large isotope effect of O-18 was observed while using the membranes from hydrophobic material (at 40° C., $\alpha = 1.0279$ and at 60° C., $\alpha = 1.0286$) (= fractionation factor). These fractionation factors are 3–4 times larger than the effects obtained in distillation of water.

BRIEF DESCRIPTION OF THE DRAWINGS

The pervaporation process can be carried out in the relatively simple apparatus. It is shown in FIGS. 1, 2 and 3.

Figure 1:
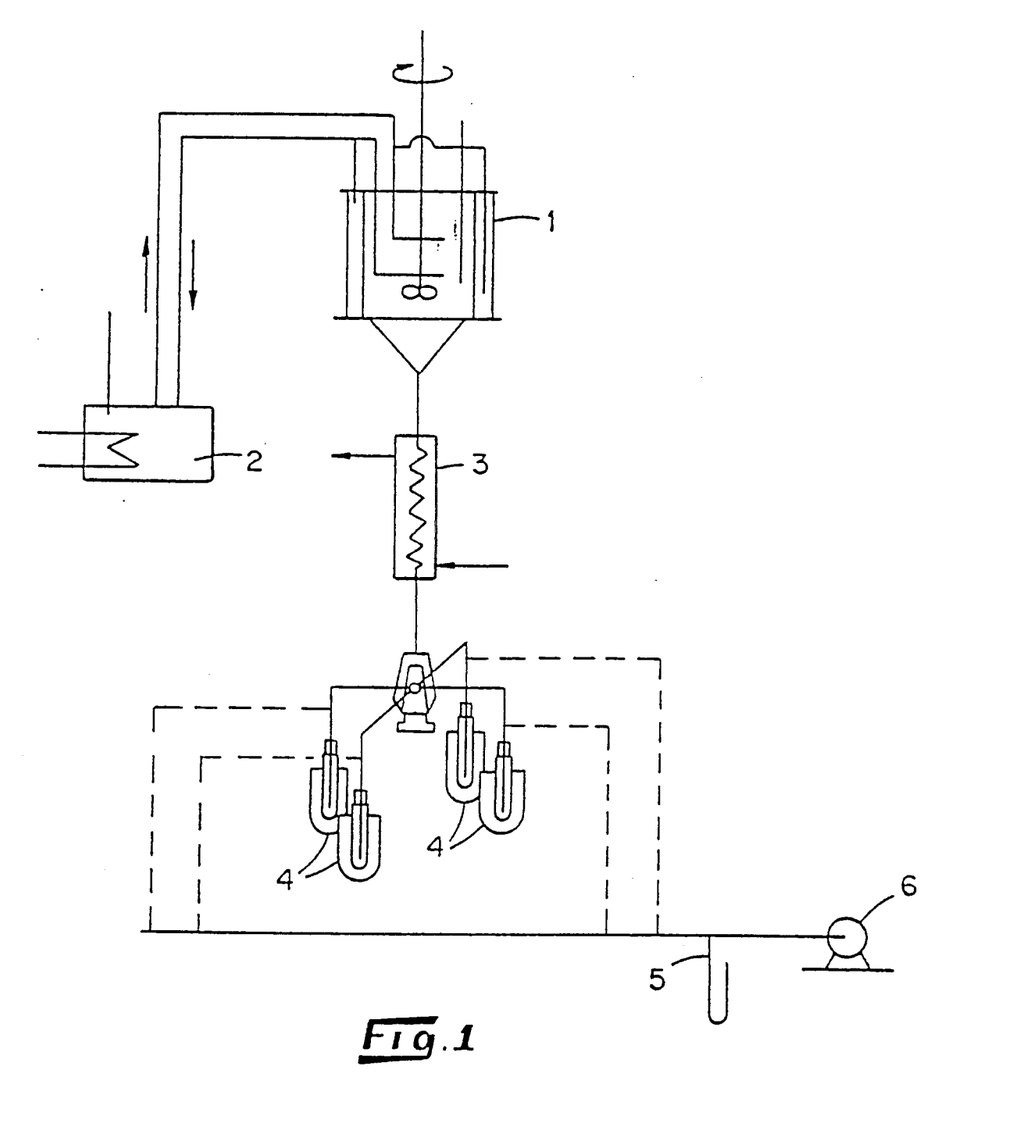

The schematic of the system for isotopic enrichment in pervaporation process is shown in FIG. 1. The liquid is placed in the permeation chamber 1 equipped with the thermostat 2, cooler 3, receiver 4, manometer 5 and vacuum pump 6.

Figure 2:
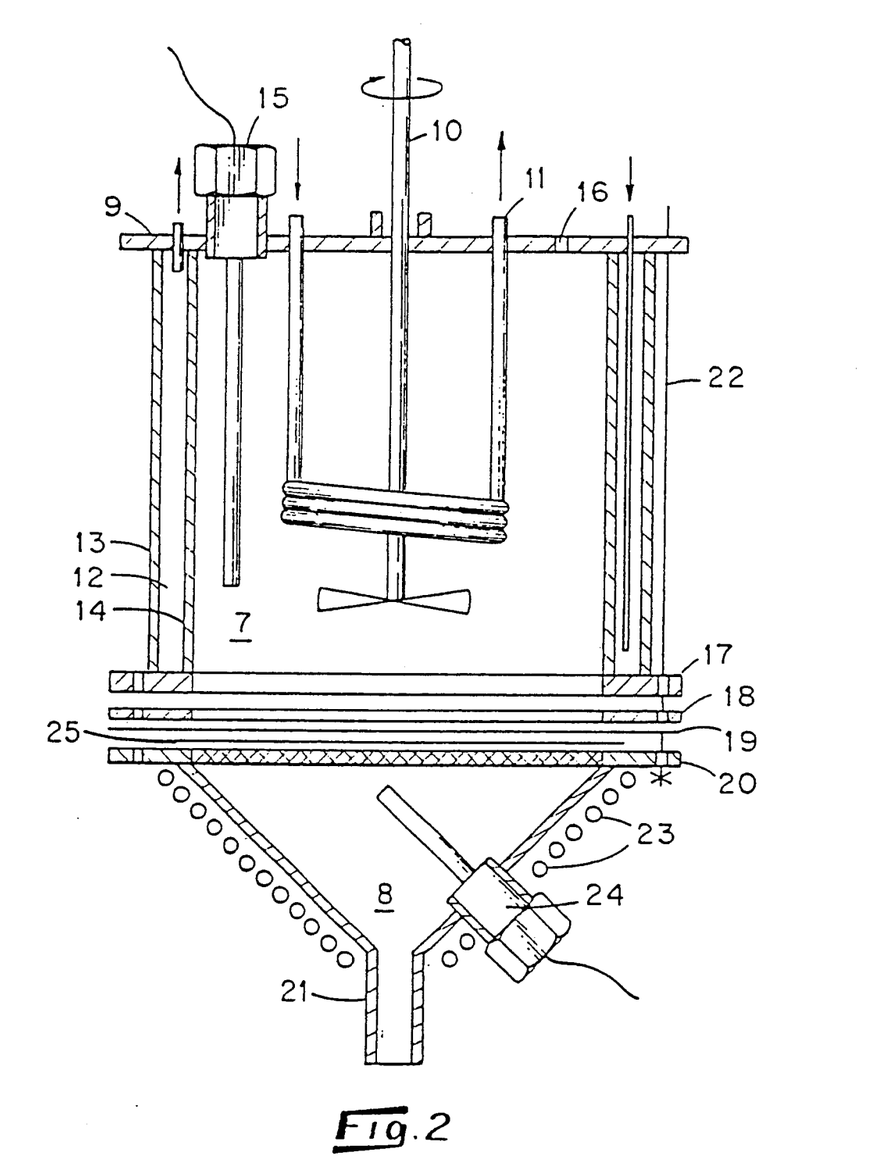

The schematic of the permeation chamber consisting of two parts is shown on the FIG. 2. The liquid chamber 7 is built from the two concentrical glass cylinders 13 and 14 which form thermostatting jacket 12. They are tightened by steel collars 9 and 17 and threaded rods 22. The temperature of the fluid in chamber 7 is monitored and controlled by the heating/(cooling) coil 11 and the resistance thermometer 15. The uniform temperature and concentration field is secured by the stirrer 10. The membrane 19 is placed on the perforated bottom 20 supported by plastic net 25 and rubber gasket 18. The temperature in the vapor chamber b is controlled by the resistance thermometer 24. The pipe 21 is the outlet to vacuum pump.

Figure 3:
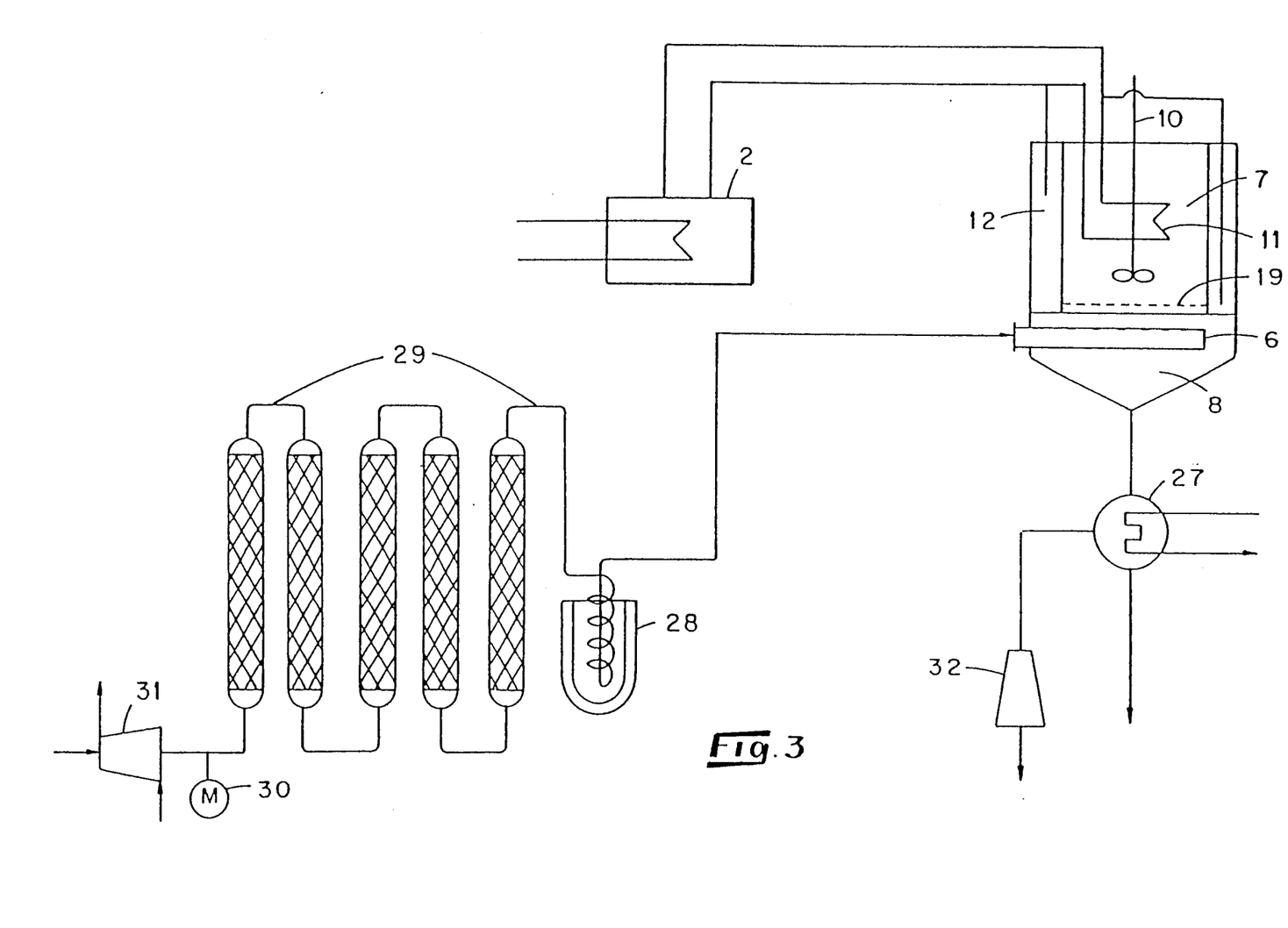

In the apparatus shown in FIG. 3, the pervaporation process with carrier gas can be carried out. The pervaporation chamber is divided by the membrane 19 into two sections: liquid 7 and vapor 8 compartments. The constant temperature in the jacket 12 is kept by thermostat 2. Temperature is regulated by heating coil 11. The stirrer 10 assures the uniformity of temperature and concentration. The carrier gas compressed by the compressor 31 and then dried in the drying column system 29 and cold trap 28 goes through the separator 6 ensuring uniform sweep of the membrane. The gas flow is controlled by the manometer 30. The vapor permeate condenses in the condenser 27 and gas is allowed to escape through the rotometer 32.

EXAMPLE I

The process of pervaporation was carried out in the system shown in FIG. 1.

1000 cc of tri-distilled natural water (O-18 concentration is 1970 ppm) was placed in the chamber 7 (see FIG. 2). The chamber 8 is the vapor chamber, into which the vapor permeate diffuses. These two chambers are separated by the hydrophobic membrane 19. After the steady conditions have been established (temperature, pressure, the permeate stream) the samples can be collected. During the process water diffuses through the membrane and then evaporates enriching itself in the lighter isotope. The vapors of the permeate are taken owing to the vacuum generated on the vapor side of the barrier and frozen in the cooling agent. The results obtained are presented in the table:

TABLE I

| Pressure mmHg | Temperature °C. | Fractionation Factor $\alpha$ |
| --- | --- | --- |
| 160 | 65 | 1.0103 |
| 160 | 70 | 1.0150 |
| 160 | 76 | 1.0188 |
| 40 | 50 | 1.02010 |
|  | 65 | 1.02860 |
| 15 | 79 | 1.02789 |
|  | 40 | 1.02370 |
| 4 | 65 | 1.02010 |
|  | 20 | 1.0164 |
|  | 40 | 1.0279 |
|  | 80 | 1.0246 | p - pressure on the vapor side of the membrane
t - temperature of the process
$\alpha$ - fractionation factor

EXAMPLE II

Another pervaporation process is carried out in the system shown in FIG. 3. The vapors of the liquid diffusing through the membrane are taken by the carrier gas (air is very advantageous one) which sweeps the bottom side of the membrane. The carrier gas flowing to the separator is dried in the drying columns and in the traps cooled in liquid nitrogen. The vapors of the permeate taken by the carrier gas are cooled in the condenser and then frozen in the cooling agent.

Liquid/vapor permeation of water through a commercial grade hydrophobic PTFE membrane shows $^{16}O/^{18}O$ separation factors, $\ln(\alpha) = \ln((X'/x)_{down-}$ stream/(x'/x)$_{upstream}$), as large as 6 times the ratio of vapor pressures, ln ($\alpha_o$)=ln(P$^{o'}$/P$^o$). The prime refers to the lighter isotope.

Isotope separations of water on pervaporation through hydrophilic cellulose acetate membranes showed separation factors, ln($\alpha_{mem}$)=ln((x'/x)$_{downstream}$/(x'/x)$_{upstream}$,) which were less than the logarithmic vapor pressure isotope effect (VPIE), ln ($\alpha_{l/V}$)=ln(P$^{o'}$/P$^o$). The prime denotes the lighter isotopic isomer, x is the concentration in mole fraction and P$^{o'}$ and P$^o$ are the equilibrium vapor pressures. Others have speculated that hydrophobic solutes should increase ln($\alpha$), and there have been a few reports of modest enhancements. Even so the increases in ln($\alpha$) have not been large enough to warrant further study, at least for purposes of practical application. The number of stages required to effect a given isotope separation increases exponentially as ln($\alpha$) falls toward zero.

Membrane fractionation measurements were made using two different hydrophobic membranes made from Polish industrial quality PTFE tapes, Tarflen 5, 84.6 microns thick, and Tarflen 6, 72.7 microns thick. In the present experiments three different polytetrafluoroethylene (PTFE) membranes were used. All were formulated at The Technical University, Szczecin, by Chlubek from polymer produced by Z. A. Tarnow, Inc. (MW=140 to 500×10$^2$ daltons, 80–85% crystallinity, density 2.25 to 2.27 g cm$^{-2}$, and bulk density 0.4 to 0.6 g cm$^{-2}$). The membranes were made by subjecting PTFE tape (50 mm wide×0.15 mm thick) to two dimensional tension, extracting with petroleum ether, and conditioning at 360° C. Pore diameters range from 1 to 100 micron and the wetting angle for water at room temperature is 106±2'. Further characterization is reported in Table II.

TABLE II

| Membrane | Room Temperature Properties of Polytetrafluoroethylene Membranes | | |
|---|---|---|---|
| | Thickness/ microns | P/kPa | Air Permeability (m$^2$air)/((m$^2$ mem)(day)) |
| Tarflen-1 | 62.0 | 2.67 | 1012 |
| | | 4.00 | 1323 |
| | | 5.33 | 1638 |
| Tarflen-5 | 84.6 | 2.73 | 378 |
| | | 4.00 | 614 |
| | | 5.33 | 930 |
| Tarflen-6 | 72.7 | 2.73 | 96 |
| | | 4.00 | 172 |
| | | 5.33 | 237 |

Figure 6:
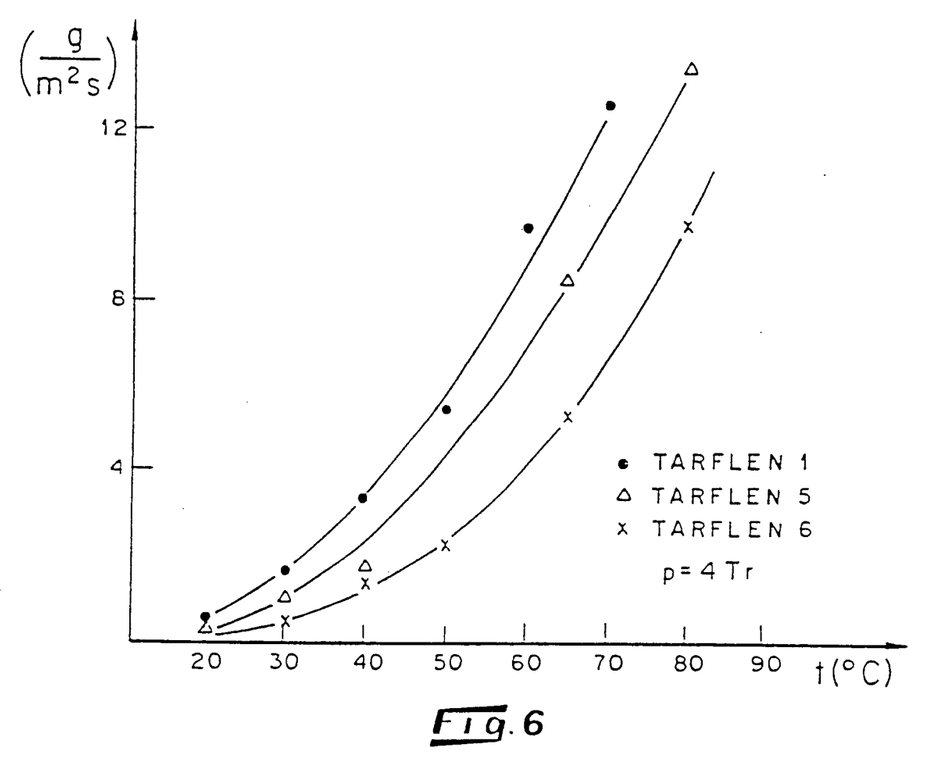

Water permeabilities for Tarflen-5 varied smoothly from 1 g m$^{-2}$s$^{-1}$ at 30° C. to 13 g m$^{-2}$s$^{-1}$ at 80° C. at a downstream pressure of 4 torr (the upstream pressure is a nominal 1 atm.), and from 1 to 14 g m$^{-2}$s$^{-1}$ at 30° and 90° C., respectively at 160 torr downstream. The Tarflen-6 is less permeable than Tarflen-5 (see Table II) and the equivalent figures are 0.5 and 9 g m$^{-2}$s$^{-1}$ at 4 torr downstream, and 0.2 and 11 g m$^{-2}$s$^{-1}$ at 160 torr downstream. Water permeability vs. temperature plots at 4 torr downstream are shown for the three membranes in FIG. 6. Membrane 1 ruptured early in the experiments and fractionation data from it is only available at 4 torr. Water permeability is lower for Tarflen 6 than for Tarflen 5. $^{16}$O/$^{18}$O separation factors for water pervaporation through cellulose acetate (Tomofan I) for purposes of comparison is reported in Table III.

TABLE III

| $^{16}$O/$^{18}$O Enrichment on Pervaporation of Water Through a Tomofan-I Hydrophilic Membrane | | | | |
|---|---|---|---|---|
| t/°C. | P$_{downstream}$/torr | 10$^2$ln($\alpha$) | R | P/P°$_{hoh}$ |
| 53.5 | 260 | 0.28 | 0.38 | 2.32 |
| 60 | 260 | 0.53 | 0.77 | 1.75 |
| 85 | 260 | 0.28 | 0.51 | 0.61 |
| 60 | 110 | 0.52 | 0.75 | 0.74 |
| 80 | 110 | 0.29 | 0.50 | 0.31 |
| 85 | 110 | 0.38 | 0.69 | 0.26 |

The experimental techniques and apparatus for the pervaporation measurements are described hereinabove. measurement of $^{16}$O/$^{18}$O pervaporation were made at the Institute of Nuclear Chemistry and Technology, Warsaw, Poland, on feed water of natural abundance. $^{16}$O/$^{18}$O ratios were obtained by isotope ratio mass spectrometry at the International Atomic Energy Agency, Vienna.

The results are summarized in Tables III, IV and V. Table III shows results for control runs for pervaporation through a hydrophilic membrane, Tomofan I. Tables IV and V report results on permeation through the hydrophobic membranes, Tarflen-5 and Tarflen-6, respectively.

Pervaporation runs through the hydrophilic membranes were made at downstream pressures of 260 and 110 Torr and at temperatures between 326 and 358 K. For these membranes, which swell in contact with water, two different transport mechanisms, ultrafiltration and pervaporation, must be considered. The data in Table III shows for $^{16}$O/$^{18}$O, the membrane separation factor, $\alpha_{mem}$=(x'/x)$_{downstream}$/((x'/x)$_{upstream}$), is significantly lowered with respect to liquid/vapor separation, $\alpha_{l/v}$.

$\alpha_{mem}$(hydrophilic)<$\alpha_{l/v}$=ln(P$^o$/P$^o$)=(x'/x)$_{vapor}$/(x'/x)$_{liquid}$)

For a hydrophobic membrane a different transport mechanism is observed. The wetting angle, 106±2° is much larger on hydrophobic Tarflen than on the cellulosic hydrophilic Tomofan membranes. Consequently liquid penetration through the capillaries requires high differential pressures, 0.5 to 2.5 MPa, for the membranes investigated. For the experimental conditions specified in Tables IV and V water can only permeate as vapor. Downstream pressures were maintained well below the equilibrium vapor pressure so that as water penetrated the membrane it was rapidly swept away for storage and analysis. Permeation runs were made over the range 323-363 K for downstream pressures 4-160 torr, (equivalent to 0.01<P/P°$_{HOH}$<0.85).

We define R as the ratio of the enrichment relative to the vapor pressure isotope effect (VPIE).

Figures 4, 5:
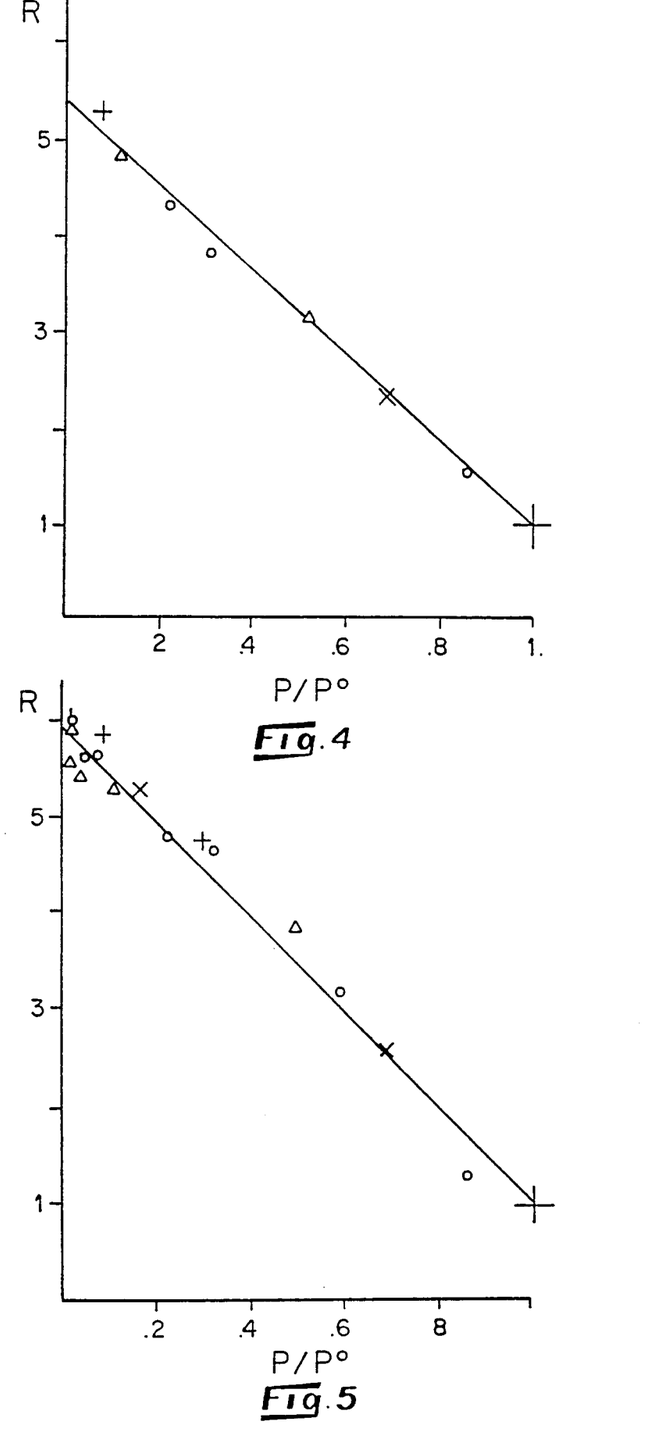
FIGS. 4–6 show process variable relations.

R=(ln((x'/x)$_{downstream}$/(x'/x)$_{upstream}$))/ln(P$^{o'}$/P'-)=ln($\alpha_{mem}$)/ln($\alpha_{l/V}$)

and in FIG. 4 and 5 plot R vs. the relative downstream water vapor pressures, P/P°$_{HOH}$, for both Tarflen-5 (FIG. 4) and Tarflen-6 (FIG. 5) data above 323.15 K (i.e. for those data points in Tables III and IV above the heavy lines). The lines in FIGS. 4 and 5 are one parameter least squares fits forced through the relative origin P/P°$_{HOH}$=1, R=1).

(R$_{16/18}$−1)=(1−P/P°$_{HOH}$)(A$_{permeation}$);
(P/P°$_{HOH}$<1

For Tarflen-5 (Table IV, FIG. 4) we find $A_{permeation} = 4.4 \pm 0.2$ with $\alpha = 0.14$, and for Tarflen-6 $A_{permeation} = 4.9 \pm 0.7$ with $\alpha = 0.23$. The one parameter fits are statistically superior to two parameter ones not forced through the origin according to the F ratio test at the 95% confidence level. Data at the bottom Tables IV and V and not included in the fits were taken at lower temperature and/or low downstream pressures where they scatter badly. We have attributed this scatter to difficulties connected with sample collection. At low temperature the water flux through the membrane is low and at low downstream pressure some problems in condensation of the samples in the collection traps may occur. Notably, however, in spite of the scatter the low temperature, low pressure samples show interestingly large R ratios, and are in qualitative agreement with the more precise higher temperature and downstream pressure results reported at the top of the tables.

The single stage $^{18}O/^{16}O$ relative enrichments reported in Tables IV and V and FIG. 4 are unexpectedly large and of practical importance. It is clear for two reasons that the separation factors cannot refer to the isotope enrichment for a single primary event of the type bulk water (liquid phase) = membrane complexed water (vapor)   (Eq I)

The first reason is theoretical. The Bigeleisen analysis of condensed phase isotope effects demonstrates that the maximum isotope effect on an equilibrium of the type given in Equation 1 will be associated with large frequency shifts in the most isotope sensitive frequencies. For water, these will clearly involve the hydrogen bonded and non-hydrogen bonded stretching motions, and the librations. To rationalize effects as large as $R=6$, however, the frequency shifts which are required, bulk to membrane complexed water, are simply too large to be credible. To explain very large $^{16}O/^{18}O$ effects (FIG. 4) one must postulate a series of primary enrichments as water diffuses through the membrane. That is to say a single membrane stage must consist of a larger number of equilibrium enrichments between bulk phase water diffusing through the pore structure with membrane-surface complexed water. The second reason is based on the observation that $R_{16/18}$ is very different from $R_{H/D}$, but we would expect them to be commensurate if both represented the primary enrichment event. Because the R values are so very different we conclude the mechanisms for the two isotope separations are different. This is most likely connected with the fact that hydrogen atom flux through the membrane (in either direction) need not be the same as the oxygen atom flux because of hydrogen exchange. Hydrogen mobility is believed to be much greater than oxygen mobility. Thus a water molecule which has been adsorbed into the membrane or on the membrane surface is more likely to exchange hydrogen with the bulk solvent than it is oxygen. In that event the relative oxygen enrichment, $R_{16/18}$, will be in excess of $R_{H/D}$.

TABLE IV $^{16}O/^{18}O$ Enrichment on Pervaporation of Water Through a Tarflen-5 Hydrophobic Membrane

| t/°C. | $P_{downstream}$/torr | $10^2 \ln(\alpha)$ | R | $P/P°_{HOH}$ |
|---|---|---|---|---|
| 65 | 160 | 1.02 | 1.56 | 0.86 |
| 70 | 160 | 1.49 | 2.37 | 0.69 |
| 76 | 160 | 1.86 | 3.11 | 0.53 |
| 90 | 160 | 2.22 | 4.27 | 0.30 |
| 65 | 60 | 2.53 | 3.84 | 0.32 |
| 65 | 40 | 2.28 | 4.29 | 0.22 |
| 79 | 40 | 2.75 | 4.76 | 0.12 |
| 90 | 40 | 2.76 | 5.32 | 0.08 |
| 50 | 40 | 1.99 | 2.66 | 0.44 |
| 40 | 15 | 2.34 | 2.98 | 0.27 |
| 65 | 15 | 1.99 | 3.03 | 0.08 |
| 20 | 4 | 1.63 | 1.80 | 0.24 |
| 40 | 4 | 2.75 | 3.50 | 0.07 |
| 65 | 4 | 3.06 | 4.66 | 0.02 |
| 80 | 4 | 2.43 | 4.20 | 0.01 |

TABLE V $^{16}O/^{18}O$ Enrichment on Pervaporation of Water Through a Tarflen-6 Hydrophobic Membrane

| t/°C. | $P_{downstream}$/torr | $10^2 \ln(\alpha)$ | R | $P/P°_{HOH}$ |
|---|---|---|---|---|
| 65 | 160 | 0.86 | 1.30 | 0.86 |
| 70 | 160 | 1.65 | 2.62 | 0.69 |
| 80 | 160 | 2.27 | 3.93 | 0.45 |
| 90 | 160 | 2.47 | 4.76 | 0.30 |
| 65 | 110 | 2.10 | 3.19 | 0.59 |
| 65 | 60 | 3.07 | 4.67 | 0.32 |
| 50 | 40 | 2.89 | 3.86 | 0.43 |
| 65 | 40 | 3.16 | 4.80 | 0.22 |
| 70 | 40 | 3.30 | 5.25 | 0.17 |
| 80 | 40 | 3.09 | 5.35 | 0.11 |
| 90 | 40 | 3.02 | 5.83 | 0.08 |
| 50.5 | 15 | 3.59 | 4.81 | 0.16 |
| 65 | 15 | 3.73 | 5.67 | 0.08 |
| 80 | 15 | 3.14 | 5.42 | 0.04 |
| 90 | 15 | 3.09 | 5.96 | 0.03 |
| 65 | 10 | 3.72 | 5.65 | 0.05 |
| 65 | 4 | 3.95 | 6.01 | 0.02 |
| 80 | 4 | 3.22 | 5.58 | 0.01 |
| 80 | 4 | 3.41 | 5.90 | 0.01 |
| 40 | 4 | 3.52 | 4.47 | 0.07 |
| 50 | 4 | 3.55 | 4.75 | 0.04 |

What is claimed is:

1. A method comprising enriching by pervaporation natural water in O-18 further by enabling enrichment of water in O-18 employing a semipermeable membrane having properties for retaining the enriched water on one side of the membrane.

2. The method according to claim 1 is characterized in that there is a phase transition from liquid to vapor on the semipermeable membrane.

3. The method according to claim 2 is characterized in that the phase transition is forced by applying vacuum on the vapor side of the membrane.

4. The method according to claim 2 is characterized in that the phase transition is obtained by using neutral carrier gas on the vapor side of the membrane.

5. The method according to claim 1 is characterized in that hydrophobic semipermeable membranes are used.

6. The method according to claim 5 is characterized in that polytetrafluoroethylene semipermeable membranes are used.

7. A method for the enrichment of oxygen-18 isotopes in water in water comprising the steps of:
    enriching O-18 by pervaporation, further by, disposing a quantity of water containing oxygen-18 isotopes in a vessel having at least one surface thereof comprising an hydrophobic semipermeable membrane, developing a pressure differential across said semipermeable membrane wherein the pressure on that side of said membrane opposite said quantity of water is less than the pressure on that side of said membrane in contact with said water, said differential pressure being sufficient to cause selective transition of the phase of the water from liquid to vapor across said membrane which has properties for enabling isotopes of oxygen lighter than oxygen-18 preferentially to pass through said membrane and said water in said vessel to be enriched in oxygen-18.

8. The method of claim 7 wherein said quantity of water is maintained at a substantially constant temperature.

9. The method of claim 7 wherein said quantity of water is maintained at a temperature of between about 20° and about 80° C. and the pressure developed on the vapor side of said membrane is between about 4 and about 160 mmHg.

10. A method for the separation of the isotopic components of a liquid in which at least one of such components is capable of vaporization comprising the steps of enriching O-18 by pervaporation, further by containing said mixture on one side of a hydrophobic semipermeable membrane, developing a pressure differential across said membrane which is sufficient to effect vaporization component passes through said membrane which has properties enabling enrichment of that portion of the nonvaporized liquid in other of the isotopic components of said liquid.

* * * * *

UNITED STATES PATENT AND TRADEMARK OFFICE
CERTIFICATE OF CORRECTION

PATENT NO. : 5,057,225

DATED : October 15, 1991

INVENTOR(S) : W. Alexander van Hook, Andrzej G. Chmielewski, Grazyna Zakrzewska-Trznadel and Nada Miljevic It is certified that error appears in the above-identified patent and that said Letters Patent is hereby corrected as shown below:

Column 1, line 62

Delete "platinum-iradium" and insert --platinum-iridium-- therefor.

Column 4, line 4

After "chamber" delete "b" and insert --8-- therefor.

Column 6, line 37

Delete "$(P^o/P^o)$" and insert --$(P^{o'}/P^o)$-- therefor.

Column 6, line 58

Delete "$In(\alpha_{mem})$" and insert --$\ln(\alpha_{mem})$-- therefor.

UNITED STATES PATENT AND TRADEMARK OFFICE
CERTIFICATE OF CORRECTION

PATENT NO. : 5,057,225

DATED : October 15, 1991

INVENTOR(S) : W. Alexander van Hook, Ardrzej G. Chmielewski, Grazyna Zakrzewska-Trznadel and Nada Miljevic It is certified that error appears in the above-identified patent and that said Letters Patent is hereby corrected as shown below:

Column 6, line 68

Delete opening parenthesis before "$P/P^o_{HOH}<1$".

Column 10, line 13, Claim 10

After "vaporization" insert --of at least one component of said mixture whereupon said vaporizable--.

Signed and Sealed this

Sixth Day of April, 1993

*Attest:*

STEPHEN G. KUNIN

*Attesting Officer*     *Acting Commissioner of Patents and Trademarks*